Aug. 25, 1970     V. E. BROOKS ET AL     3,525,266
CONTROL FOR A HYDROSTATIC TRANSMISSION
Filed April 8, 1968     5 Sheets-Sheet 1

FIG.1

INVENTORS
VERN E. BROOKS
ERLEN B. WALTON
BY
*Yount, Flynn & Tarolli*
ATTORNEYS

INVENTORS
VERN E. BROOKS
ERLEN B. WALTON
BY
ATTORNEYS

INVENTORS
VERN E. BROOKS
ERLEN B. WALTON
BY
Young, Flynn & Tarolli
ATTORNEYS

United States Patent Office 3,525,266
Patented Aug. 25, 1970

3,525,266
CONTROL FOR A HYDROSTATIC TRANSMISSION
Vern E. Brooks, Warren, and Erlen B. Walton, Farmington, Mich., assignors to Eaton Yale & Towne Inc., Cleveland, Ohio, a corporation of Ohio
Filed Apr. 8, 1968, Ser. No. 719,363
Int. Cl. G05g 11/00
U.S. Cl. 74—431                                    20 Claims

ABSTRACT OF THE DISCLOSURE

The speed ratio of a hydrostatic transmission can be varied by operation of a control mechanism which includes a manually movable control member and a pair of control members in the form of foot pedals. One of the foot pedals comprises a forward foot pedal and the other comprises a reverse foot pedal. Means is provided for positively actuating the hydrostatic transmission to a neutral condition when the control members are in a position within a predetermined distance of their neutral position. In addition, the operation of one foot pedal does not effect movement of the other foot pedal. Moreover, an indicator member is provided in association with the manually movable control member and provides an indication to the operator when the control member reaches a preselected position.

---

The present invention relates to a control mechanism for a hydrostatic transmission for use in a vehicle such as a tractor to deliver torque from the vehicle engine to the driving wheels of the vehicle, and particularly relates to such a control mechanism which includes a manually operable hand lever, as well as foot pedals adapted to be operated by the driver of the vehicle.

A control mechanism for controlling the operation of a hydrostatic transmission should be constructed for operator convenience and safety, as well as for reliability. One problem in a control mechanism for controlling a hydrostatic transmission centers around ensuring that the transmission is actuated to a neutral condition when the control lever of the vehicle is moved to neutral or within a predetermined distance of neutral. The control systems which involve manually operable control members for actuating a hydrostatic transmission for varying the speed ratio of a hydrostatic transmission involve the use of a series of links which are actuated and moved in response to movement of the control member. Frequently, any number of factors can affect the operation of the linkage and thus result in the fact that the hydrostatic transmission would not be in a neutral condition when it is desired to be in a neutral condition and when the control member is moved in the general area of neutral. Therefore, the vehicle in which the hydrostatic transmission is used would continue to operate in a forward or reverse direction, as the case may be, causing inconvenience to the driver of the vehicle who would then have to carefully move the control lever to a position to actuate the hydrostatic transmission to its neutral condition.

Accordingly, the principal object of the present invention is the provision of a new and improved control mechanism for a hydrostatic transmission and which is easily operated, safe, reliable, durable, and readily operated to neutral.

A more specific object of the present invention is to provide a new and improved control for varying the speed ratio of a hydrostatic transmission, and which control is relatively simple in construction and functions to actuate the hydrostatic transmission in a positive and reliable manner to its neutral condition.

A further object of the present invention is the provision of a new and improved control for varying the speed ratio of a hydrostatic transmission and which includes a control member movable by an operator for actuating the hydrostatic transmission to different speed ratio conditions, and wherein means is provided for positively actuating the hydrostatic transmission to its neutral condition when the control member is in a position within a predetermined distance from its neutral position.

A still further object of the present invention is the provision of a new and improved control for varying the speed ratio of a hydrostatic transmission, as noted in the next preceding paragraph, wherein a linkage interconnects the control member and the hydrostatic transmission and the linkage includes a pair of links having a lost motion connection therebetween permitting movement of the links relative to each other, and wherein the link which is connected with the hydrostatic transmission is acted on by means which positions the link in a neutral position when the other link is in a position within a predetermined range.

A further object of the present invention is the provision of a new and improved control for a hydrostatic transmission which includes a pair of foot pedals, one of which controls forward operation of the hydrostatic transmission and the other controls the reverse operation of the hydrostatic transmission, and wherein the operation of one of the foot pedals does not effect movement of the other foot pedal.

A still further object of the present invention is the provision of a new and improved control for a hydrostatic transmission and which includes a pair of foot pedals, each of which is movable to effect operation of the hydrostatic transmission, and wherein each foot pedal is associated with a linkage and each foot pedal includes a lug member which engages a link in the linkage upon movement of the foot pedal and which is spaced from the link when the pedal is in neutral.

Another object of the present invention is the provision of a new and improved control for varying the speed ratio of a hydrostatic transmission and wherein the control includes a manually movable control member and an indicator member which projects into the path of movement of the control member at a preselected position and which withdraws from the path of movement of the control member in response to forceful movement of the control member after engagement with the indicator member to enable the control member to move past the preselected position set by the indicator.

Still another object of the present invention is the provision of a new and improved control for varying the speed ratio of a hydrostatic transmission, as noted in the next preceding paragraph, and wherein the control member must have a relatively high force applied to it in order to move it past the indicator member in one direction, but can move past the indicator member in the opposite direction by the application of a substantially lesser force to the control member.

Further objects and advantages of the present invention will be apparent to those skilled in the art to which it relates from the following detailed description of a preferred embodiment of the present invention made with reference to the accompanying drawings wherein:

The present invention provides a new and improved control mechanism or system for varying the speed ratio of a hydrostatic transmission. The control mechanism includes a pair of foot pedals for controlling the hydrostatic transmission as well as a manualy operable lever for controlling the transmission. In particular, the control system is constructed so as to positively ensure that the hydrostatic transmission is returned to a neutral condition when it is desired to be shifted to neutral, and moreover this system permits separate and mutually independent operation of the foot pedals so that movement of one foot pedal does not effect movement of the other. In addition, an indicator is provided in association with the manually moved control member so as to indicate to the operator of a vehicle when a preselected speed has been attained.

Figure 1:
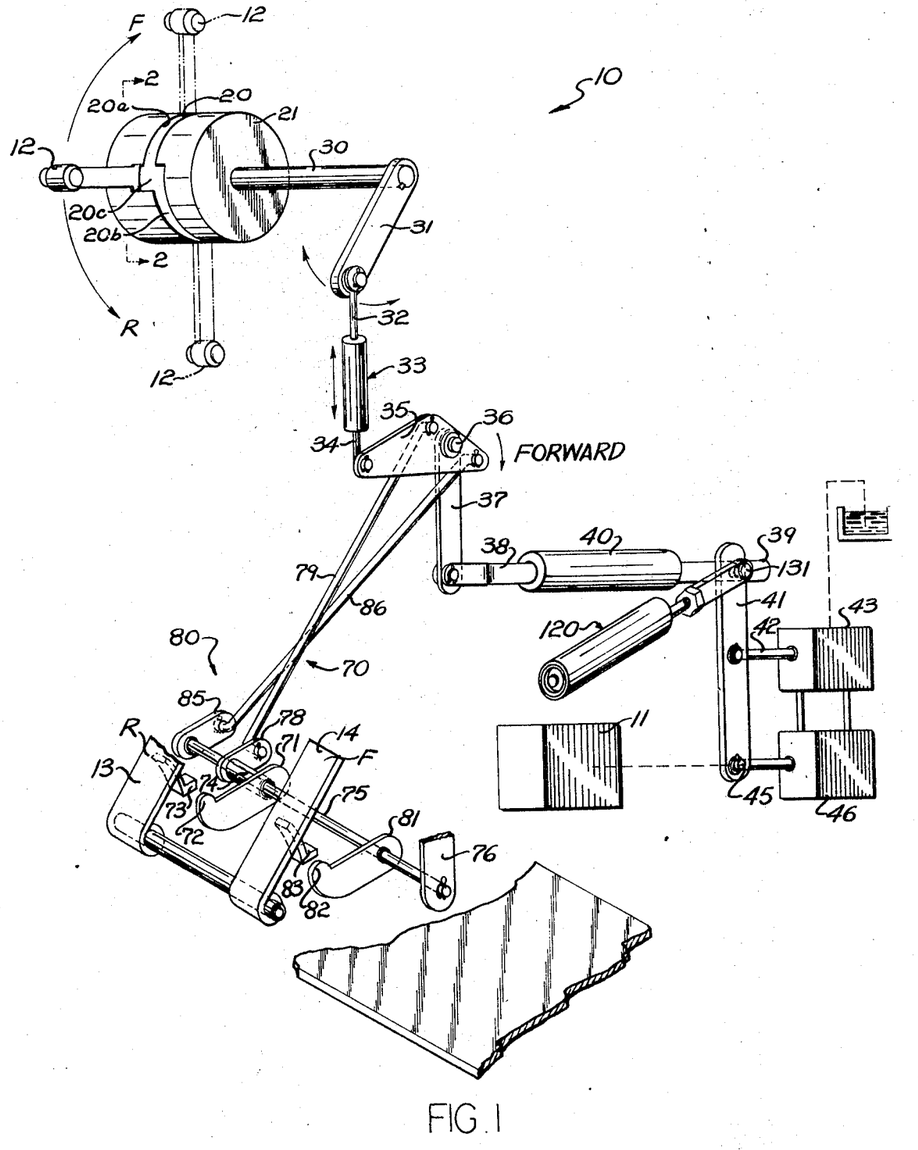
FIG. 1 is a schematic perspective view illustrating a control mechanism or system for varying the speed ratio of a hydrostatic transmission.

As representing the preferred embodiment of the present invention, FIG. 1 illustrates schematically a control mechanism or system 10 for controlling the operation of a hydrostatic transmission 11. The hydrostatic transmission is used to deliver torque from the engine of a vehicle to the driving wheels of the vehicle, and the control mechanism is operated by the vehicle driver and controls the input-output speed ratio of the transmission and also the direction of operation of the transmission. By operating the control mechanism 10, the vehicle driver can effect forward and reverse movements of the vehicle and can control the transmission speed ratio.

The control system 10 includes a manually operated control member in the form of a lever 12 which is movable to control the direction of operation and to vary the speed ratio of the transmission 11. The control system 10 also includes additional control members in the form of a pair of foot pedals 13, 14 which also are movable to control the direction of operation and to vary the speed ratio of the hydrostatic transmission 11. The foot pedal 13 comprises the reverse pedal and the foot pedal 14 comprises the forward pedal.

The lever 12 moves in a slot 20 in a housing 21. The slot 20 has a generally Z-shape. The slot 20 includes forward and reverse portions 20a, 20b, respectively, and movement of the lever 12 in the portion 20a of the slot 20 effects forward actuation of the transmission and movement of the lever 12 in the portion 20b of the slot effects actuation of the transmission 11 in a reverse direction. The central portion of the slot 20, designated 20c, comprises a neutral position and the lever 12 when in that central portion is in a neutral position.

Movement of the lever 12 in the slot 20 effects rotation of a shaft 30 in a direction depending on the direction of movement of the lever 12. Rotation of the shaft 30 in opposite directions upon movement of the lever 12 causes rotation of a link 31 which is fixedly connected to the shaft 30 at one end thereof. The other end of the link 31 is connected with a link member 32 which is operatively connected with a spring box 33. The other end of the spring box 33 is also connected with a link 34 which, in turn, is pivotally connected to a link 35. The spring box 33 is of conventional construction and will not be described herein in detail. It should be apparent though that upon rotation of the shaft 30, the link 35 is pivoted about an axis of a stub shaft 36 due to the action of the spring box 33.

The stub shaft 36 is connected with a link 37 which rotates upon rotation of the stub shaft 36. The link 37 is pivotally connected to a link 38 which, in turn, is connected to a link 39 through a spring box 40. The spring box 40 will be described in detail hereinbelow. The link 39 is connected to a control link 41 which, in turn, is connected by a link 42 to a pilot valve 43. Movement of the link 39 effects pivotal movement of the link 41 about a pivot axis 45 and effects actuation of the pilot valve 43 which controls operation of a servomotor 46. The servomotor 46 then effects actuation of the hydrostatic transmission to vary the speed ratio thereof, and specifically the servomotor 46 effects a change in the swash angle of the hydrostatic transmission, as is well known. The actuation of the servomotor 46 also effects a return movement of the link 42 to its initial position so that the valve 43 will block the flow of fluid to the servomotor 46 when the swash angle has been adjusted to the desired position, as is well known. Reference may be made to U.S. application to Bojas, Ser. No. 654,194, assigned to the assignee of the present invention, for a more detailed description of the operation of the control link 41, the pilot valve 43, and servomotor 46 to effect the change in swash of the hydrostatic transmission 11.

It should be apparent from the description hereinabove that upon movement of the control lever 12 manually through the Z-shaped slot 20, the speed ratio of the hydrostatic transmission 11 is varied. Direction and movement of the various links in the linkage which interconnect the hydrostatic transmission 11 and the control member 12 will depend upon the direction of movement of the lever 12 in the slot 20.

In accordance with the present invention, an indicator means is associated with the control lever 12 to provide an indication to the operator of the vehicle, who is moving the control lever 12, when the lever 12 has reached a preselected speed setting. The indicator means includes an indicator member 60, illustrated in FIG. 3, and which is located in the path of movement of the lever member 12. The indicator member 60 is mounted for adjustment to different locations so as to engage the lever member 12 at different selected positions. The indicator member 60 operates to give the driver of the vehicle an indication of when the speed ratio of the transmission is at a preselected value without the necessity of taking his eyes from the road and without looking at the position of the control lever 12.

Figures 3, 4:
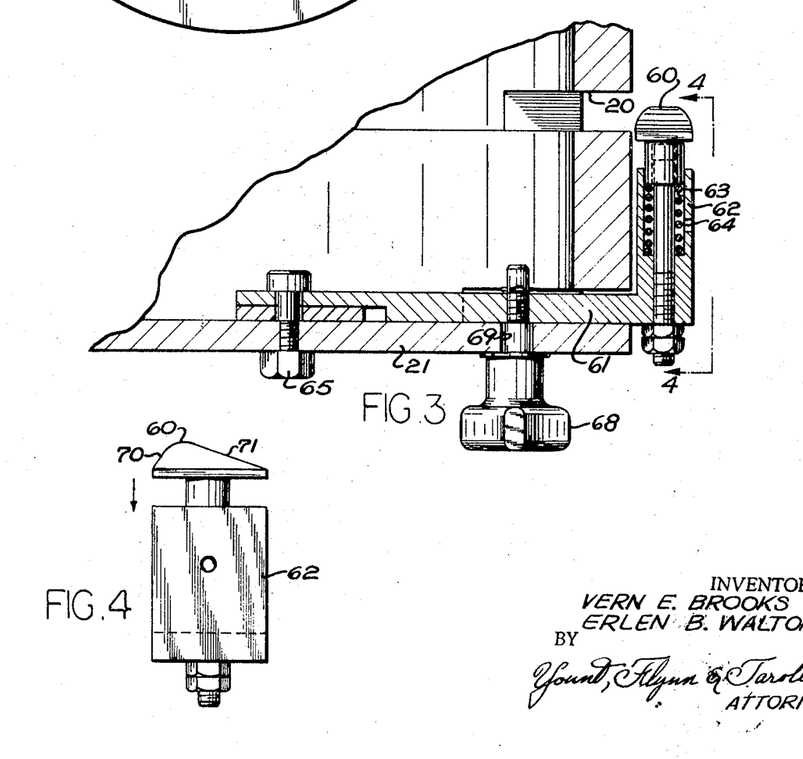
FIG. 3 is a fragmentary sectional view of the manual control illustrated in FIG. 2, taken approximately along the section line 3—3 of FIG. 2.
FIG. 4 is a plan view of an indicator member which forms a portion of the manual control illustrated in FIG. 3, and looking at the indicator member as indicated by the arrow 4—4 of FIG. 3.
Figure 5:
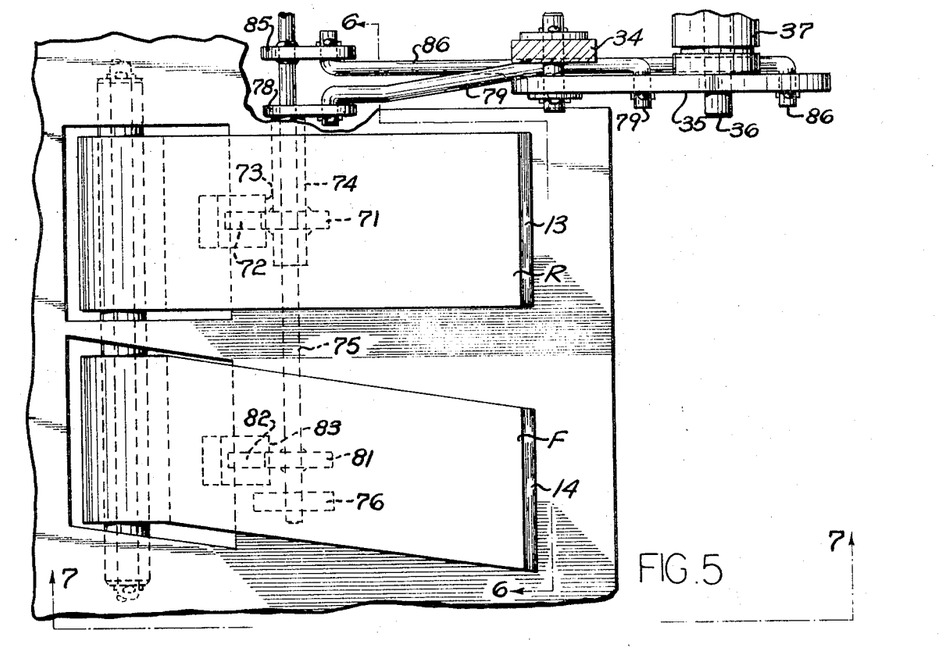
FIG. 5 is a plan view of the foot pedal controls embodied in the control system of FIG. 1.

The indicator member 60 is supported by a support arm 61 having a flange portion 62 at the outer end thereof. The flange portion 62 has a bore 63 therein in which a spring 64 is located and which biases the indicator member 60 outwardly and into the path of movement of the lever 12. As can be seen in FIG. 3, the indicator member 60 is located in an overlying relation to the slot 20 and when the control lever 12 moves through the slot, it will engage the indicator member 60 at a position depending upon the position of the indicator member 60.

The indicator member 60 can be positioned in any one of a number of locations due to the fact that the arm 61 is pivotally connected by a suitable fastening means 65 to the housing 21. The arm 61 may be secured in any adjusted position by means of a suitable fastener 68 which extends through a slot 69 in the housing 21 and which threadedly engages the arm 61. By loosening the fastener 68, the arm can be pivoted with the fastener 68 moving through the slot 69 and when the indicator member 60 is located in the desired position, the fastener 68 can be secured so as to secure the arm 61 in the desired position.

Figure 2:
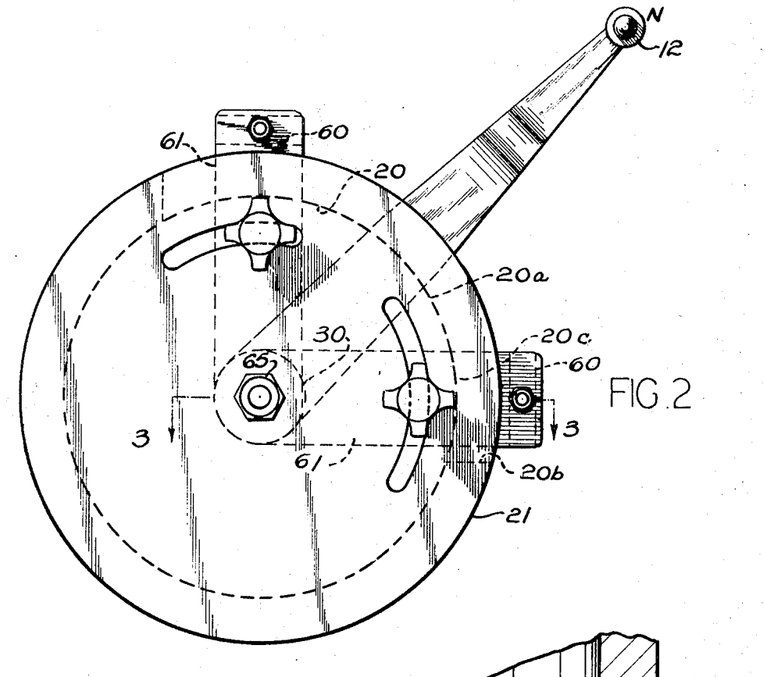
FIG. 2 is an end elevational view of the manual control portion of the control system illustrated in FIG. 1, and looking at the system of FIG. 1 as indicated by the arrow 2—2.

As is illustrated in FIG. 2, there are two indicator members 60 which can be positioned to provide upper and lower preselected speeds and function to indicate to the driver when the control member 12 moves into engagement with one of the indicator members 60. The same reference numbers are used to designate both indicator members and their associated structures.

Each of the indicator members 60 is mounted on its support arm 61 for withdrawing movement out of the path of movement of the lever member 12 in order to permit the lever member 12 to pass beyond the indicator member 60. The withdrawing movement is effected in response to a continued forceful movement of the control member 12 after it has engaged with the indicator member 60. In this respect, the indicator member 60 is provided with a cam surface 70 which is engaged by the lever member 12 when the lever member strikes the indicator 60. Due to the slant of the cam surface 70 and the surface on the lever member 12 which engages the cam surface 70, a forceful movement of the lever member 12 after it engages the cam surface 70 will effect a withdrawing movement of the indicator member 60 in the direction of the arrow, illustrated in FIG. 4. This withdrawing movement of the indicator member 60 permits the control lever 12 to be moved beyond the indicator 60 in the event that it is necessary for the driver of the vehicle to exceed the preselected speed which is desired to be maintained, as might be necessary in case of an emergency.

After the lever control member 12 is moved beyond the indicator member 60, the spring 64 forces the indicator member 60 back into the path of movement of the lever member 12 and, therefore, in order for the lever member 12 to move back into the desired range of operation, it is necessary for the lever member 12 to again pass the indicator member 60 to again become positioned in the range of movement which is desired. In this connection, the indicator member 60 is provided with a cam surface 71 of a fairly gentle slope and the lever member 12 upon forceful engagement with the cam surface 71 will effect a withdrawing movement of the indicator member 60 against the bias of the spring 64 and be able to pass beyond the indicator member 60 back into the desired range of operation of the lever 12. Of course, again, when the lever member passes back into the desired range, the indicator member 60 due to the bias of the spring 64 will again be in the path of movement of the lever 12.

It should be apparent from FIG. 4, that the cam surfaces 70, 71 are at substantially different angles and that the cam surface 70 provides a substantial resistance to passage of the lever member 12 beyond the indicator member 60, whereas the cam surface 71 will effect a withdrawing movement of the indicator member 60 with much less of a resistance to movement of the lever 12. As a result, it requires a very forceful movement of the lever 12 into engagement with the cam surface 70 in order to effect the withdrawing movement of the indicator member 60 when it is desired to exceed a preselected speed. However, when returning to the desired preselected speed range, the slight slant of the cam surface 71 permits the lever 12 to be relatively easily moved back into the desired speed range.

As noted hereinabove, the control system 10 also includes the foot pedals 13, 14 which effect a varying of the speed ratio of the hydrostatic transmission 11 upon movement thereof. The foot pedal 13 upon movement will effect a reverse operation of the hydrostatic transmission and reverse movement of the vehicle. Movement of the foot pedals 14 will effect a forward operation of the hydrostatic transmission 11 to power the vehicle in a forward direction.

Figure 6:
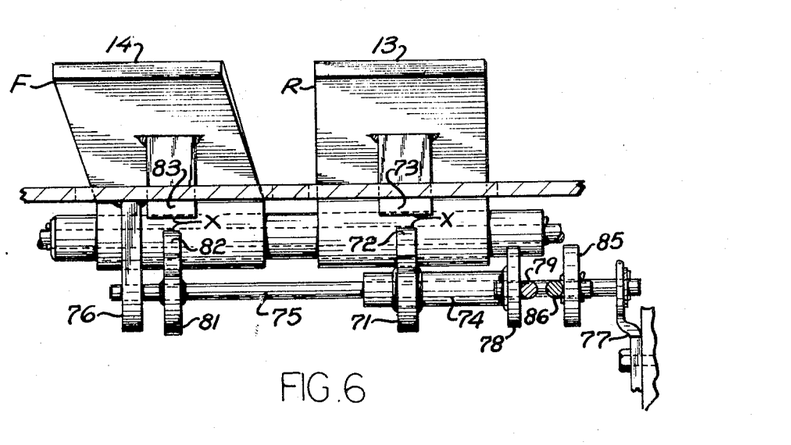
FIG. 6 is a view of the foot pedal controls shown in FIG. 5, taken approximately along the section line 6—6 thereof.

The reverse foot pedal 13 is associated with a linkage, generally designated 70, which is operated upon movement of the pedal 13 and which effects pivoting movement of the link 35 to effect a change in the speed ratio of the hydrostatic transmission 11 in the manner described above in connection with the hand control lever 12. The linkage 70 includes a link member 71 having a nose or tip portion 72 which is engaged by a lug portion 73 which projects downwardly from the pedal 13. The pedal 13 is normally biased to an upper or a normal position, as illustrated in the drawings, by a suitable torsion spring and the lug portion 73 of the pedal 13 has a predetermined space between it and the tip 72 of the link 71. This space is designated X in FIG. 6.

Upon downward movement of the reverse pedal 13 by the foot of the driver, the lug 73 moves through the space X and engages the tip 72 of the link 71. The link 71 is fixedly secured to a sleeve member 74 which is rotatably supported on a shaft 75. The shaft 75 is supported in brake support member 76, 77. The downward movement of the lug 73 effects pivoting movement of the link 71 and of the sleeve 74 about the axis of the shaft 75 and relative to the shaft 75. Also connected to the sleeve 74 is a link member 78 which has a rod 79 attached thereto. The rod 79 extends upwardly, as shown in the drawings, and is connected with the link 35. Upon movement of the foot pedal 13, therefore, it should be apparent that the link 35 will be pivoted about the axis of the stub shaft 36.

The pedal 14 for operating the hydrostatic transmission in a forward direction is associated with a linkage 80 which is similar to the linkage 70 described in connection with the foot pedal 13. The linkage 80 includes a link member 81 which has a tip portion 82 which is normally spaced a distance X from a lug 83 carried on the underside of the forward pedal 14. The pedal 14 is biased to its normal position, illustrated in the drawings, by a suitable torsion spring and upon downward movement of the pedal in opposition to the torsion spring, the lug 83 moves through the distance X, engages the tip 82 of the link 81 and effects a downward or pivotal movement of the link 81. The link 81 is fixedly connected to the shaft 75 and the downward movement of the tip 82 of the link 81 effects rotation of the shaft 75 about its axis. The shaft 75 carries a link 85 which is connected to a rod 86. The link 85 is oscillated upon rotation of the shaft 75 and the rod 86 is oscillated therewith. The other end of the rod 86 is suitably connected with the link 35 in order to effect movement of the link 35 about the axis of the stub shaft 36 in a direction opposite to the direction in which the link 35 is actuated by downward movement of the reverse pedal 13. It should be apparent, therefore, that upon depression of either the pedal 13 or the pedal 14, the link 35 will be pivoted about the axis of the stub shaft 36 and will effect through the links 37, 38 and 39 and the spring box 40 movement of the control link 41 in much the same manner as described above in connection with the pivoting movement of the control link 35 by the hand lever 12. It should be noted that link 35 may, due to the action of spring box 33, be pivoted by virtue of the depression of pedals 13 or 14 without affecting the setting of hand lever 12.

The linkages 70, 80 which are associated with the reverse and forward pedals 13, 14, respectively, are constructed and associated with the pedals so as to provide for pivoting movement of the link 35 and thus effect a variance of the speed ratio of the transmission in response to movement of the respective foot pedals 13, 14, while the other foot pedal remains stationary. More specifically, the reverse foot pedal 13 can be operated to effect a variance in the speed ratio of the hydrostatic transmission 11 without the control pedal 14 moving. Likewise, when the forward foot pedal 14 is moved to actuate the linkage 80 and effect forward operation of the hydrostatic transmission 11, the reverse pedal 13 remains stationary.

It should be apparent, of course, that when the reverse pedal 13 is operated to effect movement of the link 35 about the axis of the stub shaft 36, the movement of the link 35 about the axis of the stub shaft is transmitted through the rod 86 to the link 85 which effects movement of the link 85 and rotation of the shaft 75. This, in turn, will effect movement of the link 81. However, due to the fact that the tip 82 of the link 81 is spaced from the lug 83 on the forward pedal 14, the tip 82 of the link 81 does not engage the lug 83 on the pedal 14 but merely passes beyond it to a position, such as indicated in dotted lines in FIG. 7. As a result, the pedal 14 is not forced upwardly when the pedal 13 is operated, but rather remains stationary. Likewise, when the pedal 14 is moved to actuate the link 35, the rod 79 is moved due to the operation of the link 35 and effects rotation of the sleeve 74 and of the link 71. However, due to the fact that the gap X exists between the lug 73 and the tip 72 of the link 71, the link 71 passes beyond the lug 73 on the reverse pedal 13 and no movement of the pedal 13 will occur.

Figure 7:
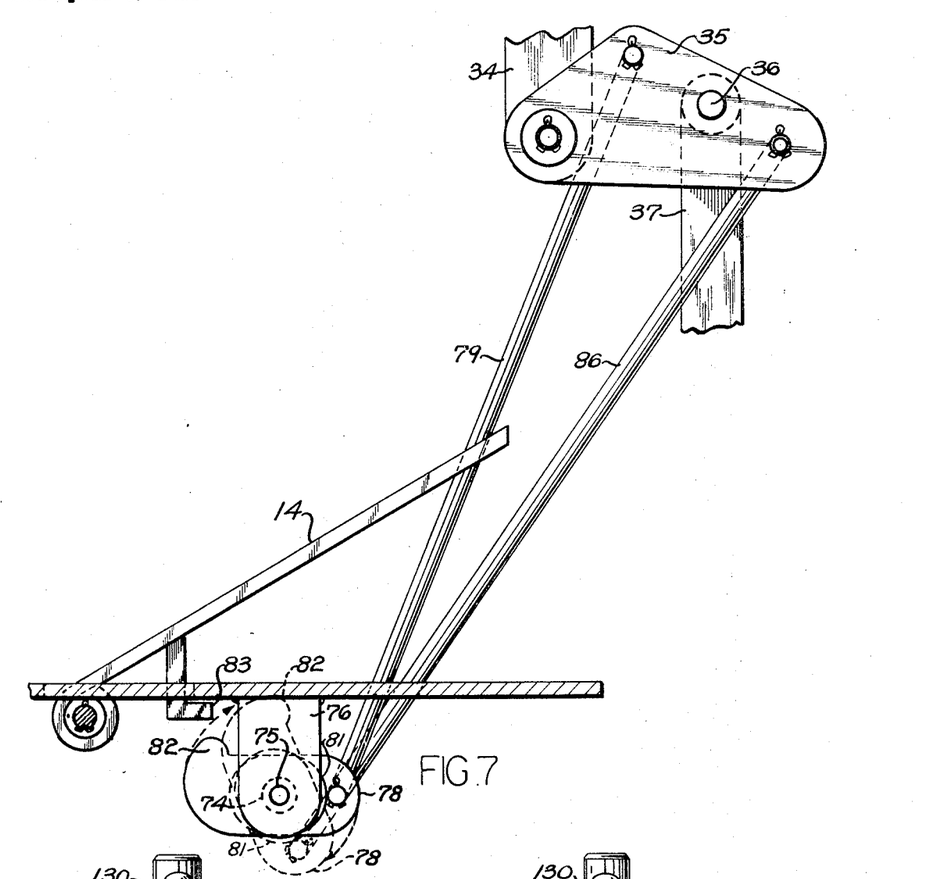
FIG. 7 is a view of the foot pedal controls shown in FIG. 5, looking at the controls of FIG. 5 along the line 7—7 thereof.

In the event that when a link 71 or 81 is in its position, as illustrated in dot-dash lines in FIG. 7, and the pedal associated with the link is actuated, the lug on the pedal will merely move downwardly behind the link or may engage the link at some point, but will not effect any pivoting movement of that link. Of course, when the pedals 13, 14 are released, the linkages 70, 80 are returned to their normal position due to the operation of the spring boxes 33, 40, as will be described hereinbelow.

It should be apparent from the description hereinabove that operation of the hand lever 12 or of either the foot pedals 13, 14 will effect pivotal movement of the link 35 about the axis of the stub shaft 36 which will, in turn, effect a varying of the speed ratio of the hydrostatic transmission 11. The spring box 40 includes a cylinder 100 which is fixedly connected with the link 38. The spring box 40 also includes a rod 101 which is fixedly connected to the link 39. The rod 101 extends into the interior of the cylinder 100 and has snap rings 102, 103 located thereon. Slidably supported on the rod adjacent the snap rings 102, 103 are piston members 104, 105. Interposed between the piston members 104, 105 is a coil spring 106. The coil spring 106 biases the piston members 104, 105 in opposite directions and against the snap rings 102, 103. The cylinder 100 also has snap rings 108, 109 at the opposite ends thereof. The snap ring 108 is illustrated as in engagement with the piston 104 and the snap ring 109 is illustrated as in engagement with the piston member 105.

Figure 8:
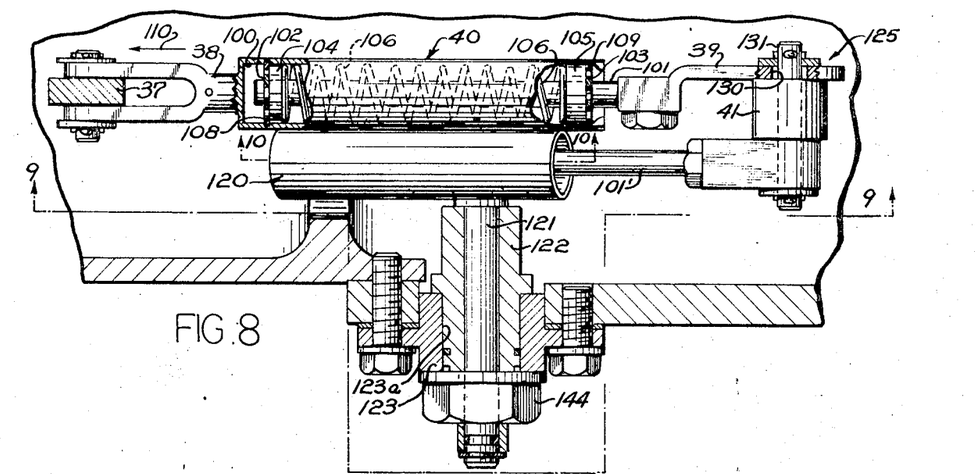
FIG. 8 is a sectional view of another portion of the control system shown in FIG. 1.

It should be apparent from the above that movement of the link 38 in the direction of the arrow 110 in FIG. 8 will effect movement of the cylinder 100 in the same direction. This movement of the cylinder 100 will likewise cause movement of the snap ring 109. The snap ring acts against the piston 105 to effect a compression of the spring 106 between the piston 105 and the piston 104 which is held in position by the snap ring 102 on the rod 101. The snap ring 108 will move away from the piston 104. This forceful compression of the spring 106 by movement of the piston 105 will result in the transmission of the force to the rod 101 causing movement of the rod 101 in a direction which corresponds with that of the arrow 110.

Movement of the link 38 in a direction opposite the direction of the arrow 110 will result in movement of the link 39 in a corresponding direction due to the operation of the spring box 40. The description of this operation of the spring box 40 will not be made in detail in view of the fact that it is precisely the reverse of the operation when the link 38 is moved in the direction of the arrow 110.

The spring box 33 is of a construction similar to the spring box 40, and it should be apparent that the spring box 33 not only permits pivotal movement of link 35 through pedal actuation without affecting the setting of hand lever 12, but also tends to return the links 70, 80 to their original position when the pedal force effecting movement of the links is withdrawn. Spring box 40 also permits rapid return of the control links 70, 80 to their initial position substantially independent of the slower moving control link 41, the speed of actuation of which is a function of the speed of pump swash adjustment.

Due to varying conditions and the linkages between the control lever 12 and the transmission 11, it is extremely difficult for the operator or driver of the vehicle in which the hydrostatic transmission 11 is utilized to position the control lever 12 in a position where the hydrostatic transmission is in neutral. Therefore, the control mechanism or system 10 is provided with means for effecting a positive positioning of the hydrostatic transmission in neutral. This positive positioning of the hydrostatic transmission in neutral is effected even though the control member 12 may not be in its precise neutral position, and, in fact, may occur when the control member 12 is in a position located a predetermined distance from its precise neutral position.

Figures 9, 10:
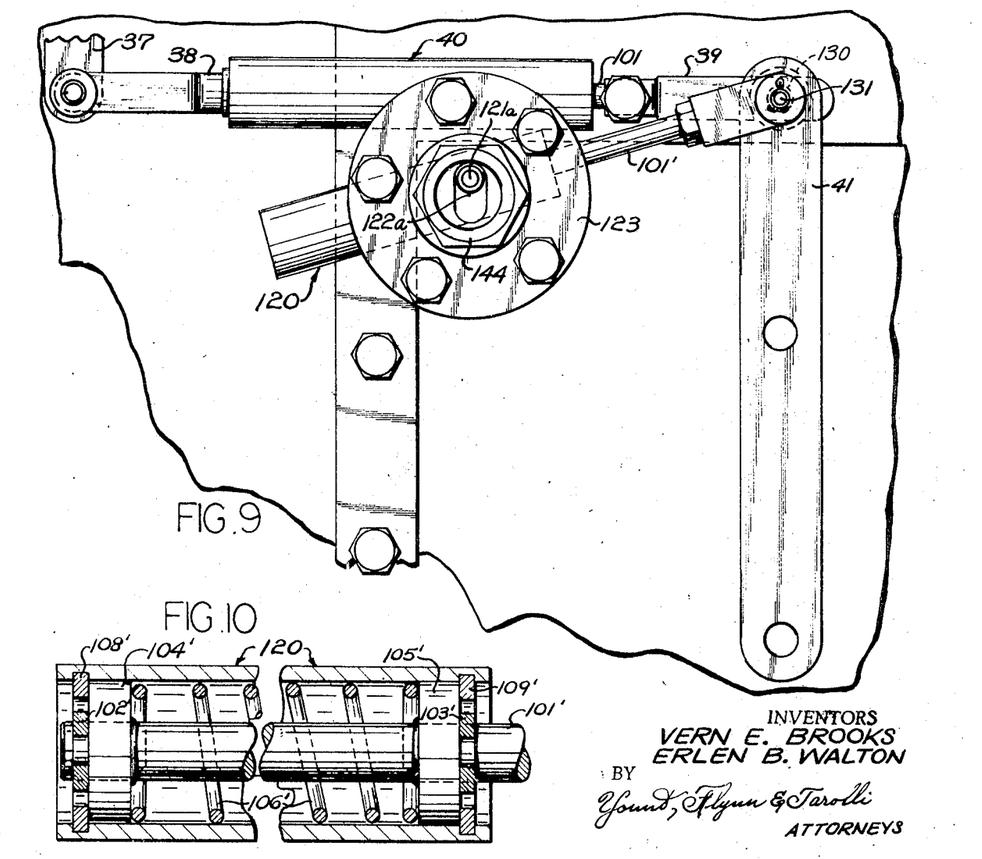
FIG. 9 is a side elevational view, taken approximately along the line 9—9 of FIG. 8.
FIG. 10 is a fragmentary sectional view of a modified embodiment of the invention taken approximately along the section line 10—10 of FIG. 8.

The means for positively actuating the transmission 11 to its neutral position comprises a spring box, generally designated 120. The spring box 120 is of a construction similar to that described above in connection with the spring box 40, and is illustrated in FIG. 10. The spring box 120, in view of its similarity in construction to the spring box 40, will not be described in detail. The operation of the spring box should be apparent from the drawings and parts which are identical to the parts of the spring box 40 and are given the same reference numeral but with a prime designation.

As noted hereinabove, the spring box 120 will effect a positive positioning of the hydrostatic transmission 11 in neutral even though the control member 12 is in a position within a predetermined distance from its neutral position and is not in its precise neutral position. The spring box 120 is fixedly connected to the control link 41 and biases the control link 41 to a precise predetermined position. The control box 120 is operated to move the link 41 to that precise predetermined position which constitutes the neutral position for the hydrostatic transmission even though the lever 12 and/or link 39 by which the control link 41 is actuated is not in a positive neutral position.

To provide for movement of the link 41 relative to the link 39, the link 39 and the control link 41 have a lost motion connection, designated 125, therebetween. The lost motion connection 125 in the embodiment illustrated in FIG. 8 consists of clearance, designated 130, between the link 39 and a pin 131 which is fixedly attached to the control link 41. The pin 131 is engaged by the rod 101' of the spring box 120 and is biased to a predetermined precise position by the spring box 120.

Figure 11:
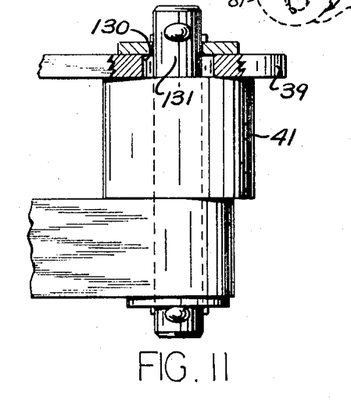
FIGS. 11 and 12 are enlarged fragmentary views illustrating different positions of portions of the mechanism shown in FIG. 8.

As illustrated in FIGS. 8 and 11, the link 39 and the control link 41 are in their positive neutral positions. The pin 131 is located centrally with respect to the clearance hole 130 in the link 39. When the link 39 is moved to effect actuation or movement of the control link 41, the clearance 130 must be taken up before the link 41 will be moved. Therefore, the link 39 moves relative to the control link 41 and then effects pivotal movement of the control link 41 to effect operation of the hydrostatic transmission.

Figure 12:
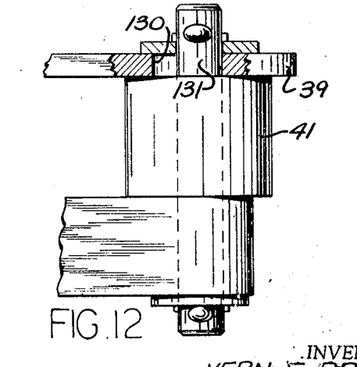

However, in the event that when the control handle 12 is returned to its neutral position, it is not precisely at neutral, then the control link 39 will not return to exactly the same position that it initially had. It may return to a position, such as is illustrated in FIG. 12. However, the positive neutral spring box 120 will return the pin 131 to its precise position and, thus, the control link 41 to its positive neutral position. This operation will occur within a range of relative movement determined by the amount of lost motion provided between the link 41 and the link 39. Thus, even though the link 39 may not return to its fixed positive neutral position, the control link 41 will be returned to a positive neutral position by the positive neutral spring box 120. Thus, the spring box 120 will positively place the hydrostatic transmission 11 in neutral, even though the link 39 and/or the control member 12 is not in its positive neutral position, but rather is in a position within a predetermined distance from its neutral position, as determined by the lost motion which is provided between the link 39 and the control link 41.

The positive neutral positioning of the control link 41 by the positive neutral spring box 120 can be effected by a modified construction with the elimination of the clearance 130. This advantage of positive neutral can be achieved without the clearance 130 by providing the lost motion in the spring box 40 itself. The lost motion will then be effected between the link 38 and the link 39. The lost motion would be achieved by providing the spring 106′ in the positive neutral spring box 120 with a spring box preload which is in excess of the spring box preload for the spring 106 for the spring box 40. Thus, the movement of the link 38 would effect a compression of the spring 106 in the spring box 40, increasing its force to the point where it would overcome the spring in the positive neutral spring box 120 to effect actuation of the control link 41. However, in the event that the control link 38 did not return to its initial position or its precise neutral position, the higher preloaded spring 106′ in the spring box 120 will effect movement of the links 39 and 41 relative to the link 38 and effect a compression of the spring 106 in a spring box 40 in order to positively position the link 41 in a positive precise neutral position. This alternative embodiment is not illustrated in view of the fact that it would be identical with FIG. 8 with the exception that clearance 130 would not be illustrated. It is, of course, understood that this embodiment does involve the use of different spring preloads in the spring boxes 40 and 120 in order to effect the positive neutral.

The spring box 120 is supported in the frame of the vehicle for pivotal movement about the axis of a pin 121. The pin 121 at its outer end is connected with the spring box 120 and upon pivoting movement of the control link 41 permits pivoting of the spring box 120 about its axis. The pin 121 is carried eccentrically in a sleeve 122. The center of the pin is designated 121a in FIG. 9 and the center of the sleeve is designated 122a in FIG. 9.

The adjustment of the precise neutral position of the control link 41 can be effected by rotation of the sleeve 122 in the bore 123a of a sleeve 123 in which the sleeve 122 is mounted. Rotation of the sleeve 122 in the bore 123 will effect a translation of the center of the pin 121a about an arc with the center of the sleeve 122 being the center of the arc. In this manner, the position of the pin 131 can be adjusted to provide the neutral position of the link 41. Once the adjustment is effected, it may be maintained by tightening the nut 144 which will secure the sleeve 122 in a fixed position.

It should be apparent from the above that a convenient, safe and reliable control system for varying the speed ratio of a hydrostatic transmission has been provided and has been described and that certain modifications, changes, and adaptations may be made therein.

Having described our invention, we claim:

1. A control for varying the speed ratio of a hydrostatic transmission comprising a control member movable by an operator, said control member having a neutral position and movable therefrom to vary the speed ratio of the transmission, interconnecting means operatively connected with said control member and the transmission for varying the speed ratio of the transmission in response to actuation of said control member, said transmission having a neutral condition when said control member is in said neutral position, and means for positively actuating the transmission to said neutral condition when said control member is in a position within a predetermined distance from its neutral position while maintaining said control member in said position which is within a predetermined distance from its neutral position.

2. A control for varying the speed ratio of a hydrostatic transmission comprising a control member movable by an operator, said control member having a neutral position and movable therefrom to vary the speed ratio of the transmission, interconnecting means operatively connected with said control member and the transmission for varying the speed ratio of the transmission in response to actuation of said control member, said interconnecting means including a pair of links having a lost motion connection therebetween, one of said links being movable upon movement of said control member and the other of said links being connected to control the speed ratio of the transmission upon movement thereof, and means for moving said other link relative to said one link to actuate the transmission to a neutral condition.

3. A control as defined in claim 2 wherein said lost motion connection comprises a pin connected with one of said links and the other of said links having an opening therein into which said pin projects and wherein clearance is provided between said pin and said one link.

4. A control as defined in claim 3 wherein said means for moving said other link relative to said one link comprises spring means acting on said pin and operable to position said pin in a predetermined position in said opening in said one link when said one link is in a positio within a predetermined distance of a neutral position.

5. A control as defined in claim 2 wherein said lost motion connection comprises spring means interposed between said pair of links and said means for moving said other link relative to said one link comprises a spring acting on said other link.

6. A control for varying the direction of operation and speed ratio of a hydrostatic transmission for a vehicle comprising a pair of foot pedals to be operated by the vehicle driver, one of said foot pedals comprising a forward pedal and the other comprising a reverse pedal, first means operatively associated with said forward pedal to effect operation of the transmission in a forward direction and at a speed ratio depending upon the position of said forward pedal, second means operatively associated with said reverse pedal to effect operation of the hydrostatic transmission in a reverse direction and at a speed ratio dependent upon the position of said reverse pedal, said first and second means each including linkage means operated by said respective pedals, each of said linkage means being operable to vary the speed ratio of the transmission in response to movement of its associated foot pedal while the other foot pedal remains stationary.

7. A control as defined in claim 6 wherein each of said linkage means comprises a link member having a spaced relationship with its associated foot pedal and which is movable to an inoperative position relative to its associated foot pedal upon movement of the other foot pedal.

8. A control as defined in claim 6 further including a manually movable control lever, means connecting said control lever to a common link member and said linkage means each including a link connected with said common link member, said common link member being connected to vary the speed ratio of said hydrostatic transmission upon movement thereof.

9. A control apparatus for varying the speed ratio of a hydrostatic transmission comprising a manually operable control member movable to vary the speed ratio of the hydrostatic transmission, a selectively settable indicator member located in the path of movement of said control member and engageable therewith to indicate to an operator when said control member is in a preselected position, means supporting said indicator member for withdrawing movement out of the path of movement of said control member, and means for effecting said withdrawing movement of said indicator member in response to continued forceful movement of said control member after engagement with said indicator member to enable said control member to move past said preselected position to thereby cause the rate of power transmission by said hydrostatic transmission to be increased to a rate above a rate corresponding to said preselected position.

10. A control as defined in claim 9 wherein said indicator member and said control member have cooperating engageable cam surfaces which engage and cause said withdrawing movement of said indicator member in response to continued forceful movement of said control member.

11. A control as defined in claim 10 wherein the cam surface on a first side of said indicator member is disposed at a relatively steep angle to the path of movement of said control member compared to the angle at which the cam surface on a second side of said indicator member is disposed to the path of movement of said control member to provide a substantial resistance to withdrawing movement of said indicator member in one direction of movement of said control member and substantially less resistance to movement of said control member in the opposite direction of movement of said control member.

12. A control for varying the direction of operation and speed ratio of a hydrostatic transmission for a vehicle comprising a pair of foot pedals to be operated by the vehicle operator, one of said foot pedals comprising a forward pedal and the other comprising a reverse pedal, first means operatively associated with said forward pedal to effect operation of the transmission in a forward direction and at a speed ratio depending upon the position of said forward pedal, second means operatively associated with said reverse pedal to effect operation of the hydrostatic transmission in a reverse direction and at a speed ratio dependent upon the position of said reverse pedal, each of said first and second means being operable to vary the speed ratio of the transmission in response to movement of its associated foot pedal while the other foot pedal remains stationary.

13. A control as defined in claim 12 wherein said first means includes a first member movable in one direction and said second means includes a second member movable in the opposite direction, the control further including means operatively interconnecting said forward pedal and said first member to effect movement thereof upon movement of said forward pedal and means operatively interconnecting said reverse pedal and said second member to effect movement thereof upon movement of said reverse pedal.

14. A control for varying the speed ratio of a hydrostatic transmission comprising a control member movable by an operator, said control member having a neutral position and movable therefrom to vary the speed ratio of the transmission, interconnecting means operatively connected with said control member and the transmission for varying the speed ratio of the transmission in response to actuation of said control member, said transmission having a neutral condition when said control member is in said neutral position, means for positively actuating the transmission to said neutral condition when said control member is in a position within a predetermined distance from its neutral position, a selectively settable indicator member located in the path of movement of the control member and engageable therewith to indicate to an operator when said control member is in a preselected position, means supporting said indicator member for withdrawing movement out of the path of movement of said control member, and means for effecting said withdrawing movement of said indicator member in response to continued forceful movement of said control member after engagement with said indicator member.

15. A control as defined in claim 14 wherein said indicator member and said control member have cooperable surfaces which are engageable to effect the withdrawing movement of said indicator member.

16. A control for varying the direction of operation and speed ratio of a hydrostatic transmission for a vehicle comprising a pair of foot pedals to be operated by the vehicle operator, one of said foot pedals comprising a forward pedal and the other comprising a reverse pedal, first means operatively associated with said forward pedal to effect operation of the transmission in a forward direction and at a speed ratio depending upon the position of said forward pedal, second means operatively associated with said reverse pedal to effect operation of the hydrostatic transmission in a reverse direction and at a speed ratio dependent upon the position of said reverse pedal, each of said first and second means being operable to vary the speed ratio of the transmission in response to movement of its associated foot pedal while the other foot pedal remains stationary, said first means including a first member movable in one direction and said second means including a second member movable in the opposite direction, the control further including means operatively interconnecting said forward pedal and said first member to effect movement thereof upon movement of said forward pedal and means operatively interconnecting said reverse pedal and said second member to effect movement thereof upon movement of said reverse pedal, each of said operative interconnections including parts spaced relative to each other so as to engage upon movement of their associated pedal and remain disengaged upon movement of the other pedal.

17. A control for varying the speed ratio of a hydrostatic transmission comprising a control member movable by an operator, said control member having a neutral position and movable therefrom to vary the speed ratio of the transmission, interconnecting means operatively connected with said control member and the transmission for varying the speed ratio of the transmission in response to actuation of said control member, said transmission having a neutral condition when said control member is in said neutral position, and means for positively actuating the transmission to said neutral condition when said control member is in a position within a predetermined distance from its neutral position, said interconnecting means including at least a pair of link members having a lost motion connection therebetween, one of said link members being movable upon movement of said control member and the other of said link members being connected to control the speed ratio of the transmission, and said means for positively actuating the transmission to said neutral condition including means for moving said other link member relative to said one link member.

18. A control mechanism as defined in claim 17 wherein said means for positively actuating said transmission to said neutral condition comprises spring means engageable with said other link member for positioning said other link member in a positive precise position.

19. A control as defined in claim 18 further including means adjustably mounting said spring means for adjustable movement in order to adjust said precise neutral position of said other link member.

20. A control for varying the speed ratio of a hydrostatic transmission comprising a control member movable by an operator, said control member having a neutral position and movable therefrom to vary the speed ratio of the transmission, interconnecting means operatively connected with said control member and the transmission for varying the speed ratio of the transmission in response to actuation of said control member, said transmission having a neutral condition when said control member is in said neutral position, means for positively actuating the transmission to said neutral condition when said control member is in a position within a predetermined distance from its neutral position, a pair of foot pedals, one of said foot pedals comprising a forward pedal and the other comprising a reverse pedal, and first and second linkage means operated by said respective pedals and each of said linkage means being operable to vary the speed ratio of the transmission in response to movement of its associated pedal while the other foot pedal remains stationary.

References Cited

UNITED STATES PATENTS

| | | | |
|---|---|---|---|
| 912,717 | 2/1909 | Murphy | 74—526 |
| 2,477,589 | 8/1949 | Du Shane | 74—526 |
| 3,313,174 | 4/1967 | Walker et al. | 74—474 |
| 3,316,773 | 5/1967 | Findlay | 74—481 |
| 3,354,981 | 11/1967 | Swanson et al. | 74—481 X |

MILTON KAUFMAN, Primary Examiner

U.S. Cl. X.R.

74—470, 474, 478, 491, 526